United States Patent
Narayanaswamy et al.

(10) Patent No.: US 8,726,338 B2
(45) Date of Patent: May 13, 2014

(54) DYNAMIC THREAT PROTECTION IN MOBILE NETWORKS

(75) Inventors: Krishna Narayanaswamy, Saratoga, CA (US); Subramanian Iyer, Fremont, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 24 days.

(21) Appl. No.: 13/434,153

(22) Filed: Mar. 29, 2012

(65) Prior Publication Data

US 2013/0205361 A1   Aug. 8, 2013

Related U.S. Application Data (60) Provisional application No. 61/594,164, filed on Feb. 2, 2012.

(51) Int. Cl.
| | | |
|---|---|---|
| H04L 29/06 | (2006.01) | |
| G06F 17/00 | (2006.01) | |
| G06F 11/00 | (2006.01) | |
| G06F 12/14 | (2006.01) | |
| G06F 12/16 | (2006.01) | |
| G08B 23/00 | (2006.01) | |

(52) U.S. Cl.
USPC ........ 726/1; 726/15; 726/22; 726/24; 726/25; 709/207

(58) Field of Classification Search
None
See application file for complete search history.

(56) References Cited

U.S. PATENT DOCUMENTS

| | | |
|---|---|---|
| 5,452,442 A | 9/1995 | Kephart |
| 5,675,711 A | 10/1997 | Kephart et al. |
| 6,304,901 B1 | 10/2001 | McCloghrie et al. |
| 6,357,008 B1 | 3/2002 | Nachenberg |
| 6,539,019 B1 | 3/2003 | Noy et al. |
| 6,553,378 B1 | 4/2003 | Eschelbeck |
| 6,577,920 B1 | 6/2003 | Hypponen et al. |
| 6,785,818 B1 | 8/2004 | Sobel et al. |
| 6,804,233 B1 | 10/2004 | Congdon et al. |
| 6,914,905 B1 | 7/2005 | Yip et al. |

(Continued)

FOREIGN PATENT DOCUMENTS

| | | |
|---|---|---|
| WO | 9512162 A1 | 5/1995 |
| WO | 2007007326 A2 | 1/2007 |

OTHER PUBLICATIONS

U.S. Appl. No. 13/247,357, filed Sep. 28, 2011, entitled Network Address Preservation in Mobile Networks.

(Continued)

*Primary Examiner* — Shin-Hon Chen
(74) *Attorney, Agent, or Firm* — Shumaker & Sieffert, P.A.

(57) ABSTRACT

In general, techniques are described for dynamic threat protection in mobile networks. A network system comprising a network security device and a management system may implement the techniques. The management system includes a network server having a shared database. A mobile device manager (MDM) of the management system receives a report message from a mobile device, specifying a threat to a mobile network. The MDM publishes the threat to the shared database. A network management system (NMS) of the management system receives data from the shared database identifying the threat and generates a security policy that specifies actions to address the threat. The NMS then installs the security policy in the network security device so that the network security device performs the actions of the security policy to address the threat.

26 Claims, 6 Drawing Sheets

(56) References Cited

U.S. PATENT DOCUMENTS

| | | |
|---|---|---|
| 6,934,857 B1 | 8/2005 | Bartleson et al. |
| 6,944,130 B1 | 9/2005 | Chu et al. |
| 6,970,697 B2 | 11/2005 | Kouznetsov et al. |
| 6,971,019 B1 | 11/2005 | Nachenberg et al. |
| 6,973,305 B2 | 12/2005 | McLean |
| 6,987,963 B2 | 1/2006 | Kouznetsov et al. |
| 7,000,250 B1 | 2/2006 | Kuo et al. |
| 7,007,302 B1 | 2/2006 | Jagger et al. |
| 7,010,600 B1 | 3/2006 | Prasad et al. |
| 7,062,553 B2 | 6/2006 | Liang |
| 7,065,790 B1 | 6/2006 | Gryaznov |
| 7,069,594 B1 | 6/2006 | Bolin |
| 7,076,650 B1 | 7/2006 | Sonnenberg |
| 7,080,408 B1 | 7/2006 | Pak et al. |
| 7,086,090 B1 | 8/2006 | Dawson, Jr. et al. |
| 7,089,592 B2 | 8/2006 | Adjaoute |
| 7,096,368 B2 | 8/2006 | Kouznetsov et al. |
| 7,096,501 B2 | 8/2006 | Kouznetsov et al. |
| 7,143,435 B1 | 11/2006 | Droms et al. |
| 7,146,642 B1 | 12/2006 | Magdych et al. |
| 7,150,042 B2 | 12/2006 | Wolff et al. |
| 7,155,742 B1 | 12/2006 | Szor |
| 7,171,689 B2 | 1/2007 | Beavers |
| 7,171,690 B2 | 1/2007 | Kouznetsov et al. |
| 7,203,959 B2 | 4/2007 | Nachenberg et al. |
| 7,210,168 B2 | 4/2007 | Hursey et al. |
| 7,228,565 B2 | 6/2007 | Wolff et al. |
| 7,231,440 B1 | 6/2007 | Kouznetsov et al. |
| 7,231,637 B1 | 6/2007 | McEwan |
| 7,243,373 B2 | 7/2007 | Muttik et al. |
| 7,251,830 B1 | 7/2007 | Melchione |
| 7,420,979 B2 | 9/2008 | Nozue et al. |
| 7,509,680 B1 | 3/2009 | Sallam |
| 7,546,458 B1 | 6/2009 | Singla et al. |
| 2002/0042886 A1 | 4/2002 | Lahti et al. |
| 2002/0049862 A1 | 4/2002 | Gladney et al. |
| 2002/0066024 A1 | 5/2002 | Schmall et al. |
| 2002/0099518 A1 | 7/2002 | Tovinkere et al. |
| 2003/0023865 A1 | 1/2003 | Cowie et al. |
| 2003/0065793 A1 | 4/2003 | Kouznetsov et al. |
| 2003/0074573 A1 | 4/2003 | Hursey et al. |
| 2003/0115483 A1 | 6/2003 | Liang |
| 2003/0120951 A1 | 6/2003 | Gartside et al. |
| 2003/0131248 A1 | 7/2003 | Huang |
| 2003/0159070 A1 | 8/2003 | Mayer et al. |
| 2003/0172294 A1 | 9/2003 | Judge |
| 2003/0229801 A1 | 12/2003 | Kouznetsov et al. |
| 2003/0233566 A1 | 12/2003 | Kouznetsov et al. |
| 2003/0233574 A1 | 12/2003 | Kouznetsov et al. |
| 2004/0002882 A1 | 1/2004 | Safa |
| 2004/0003276 A1 | 1/2004 | Kouznetsov et al. |
| 2004/0025042 A1 | 2/2004 | Kouznetsov et al. |
| 2004/0034794 A1 | 2/2004 | Mayer et al. |
| 2004/0060046 A1 | 3/2004 | Good et al. |
| 2004/0064737 A1 | 4/2004 | Milliken et al. |
| 2004/0098482 A1 | 5/2004 | Asano |
| 2004/0107342 A1 | 6/2004 | Pham et al. |
| 2004/0123117 A1 | 6/2004 | Berger |
| 2004/0172551 A1 | 9/2004 | Fielding et al. |
| 2004/0181687 A1 | 9/2004 | Nachenberg et al. |
| 2004/0209609 A1 | 10/2004 | Kouznetsov et al. |
| 2004/0250115 A1 | 12/2004 | Gemmel et al. |
| 2004/0260775 A1 | 12/2004 | Fedele |
| 2005/0055559 A1 | 3/2005 | Bucher |
| 2005/0071446 A1 | 3/2005 | Graham et al. |
| 2005/0108557 A1 | 5/2005 | Kayo et al. |
| 2005/0111455 A1 | 5/2005 | Nozue et al. |
| 2005/0114507 A1 | 5/2005 | Tarui et al. |
| 2005/0132184 A1 | 6/2005 | Palliyil et al. |
| 2005/0216749 A1 | 9/2005 | Brent |
| 2005/0216762 A1 | 9/2005 | Peikari |
| 2005/0229254 A1 | 10/2005 | Singh et al. |
| 2005/0251862 A1 | 11/2005 | Talvitie |
| 2006/0005244 A1 | 1/2006 | Garbow et al. |
| 2006/0026687 A1 | 2/2006 | Peikari |
| 2006/0041863 A1 | 2/2006 | Saito |
| 2006/0048227 A1 | 3/2006 | Ohta et al. |
| 2006/0064755 A1 | 3/2006 | Azadet et al. |
| 2006/0075501 A1 | 4/2006 | Thomas et al. |
| 2006/0117386 A1 | 6/2006 | Gupta et al. |
| 2006/0130141 A1 | 6/2006 | Kramer et al. |
| 2006/0130144 A1 | 6/2006 | Wernicke |
| 2006/0161984 A1 | 7/2006 | Phillips et al. |
| 2006/0161985 A1 | 7/2006 | Zhao |
| 2006/0190721 A1 | 8/2006 | Kawakami et al. |
| 2006/0191011 A1 | 8/2006 | Korkishko et al. |
| 2006/0200863 A1 | 9/2006 | Ray et al. |
| 2006/0209895 A1 | 9/2006 | Hirota |
| 2006/0212549 A1 | 9/2006 | Hokkyo et al. |
| 2006/0217111 A1 | 9/2006 | Marolia et al. |
| 2006/0217113 A1 | 9/2006 | Rao et al. |
| 2006/0236393 A1 | 10/2006 | Kramer et al. |
| 2006/0242709 A1 | 10/2006 | Seinfeld et al. |
| 2006/0274768 A1 | 12/2006 | Suzuki et al. |
| 2006/0276173 A1 | 12/2006 | Srey et al. |
| 2006/0277408 A1 | 12/2006 | Bhat et al. |
| 2006/0278694 A1 | 12/2006 | Jha et al. |
| 2006/0282528 A1 | 12/2006 | Madams et al. |
| 2006/0288411 A1 | 12/2006 | Garg et al. |
| 2007/0028296 A1 | 2/2007 | Wachtler et al. |
| 2007/0030539 A1 | 2/2007 | Nath et al. |
| 2007/0056035 A1 | 3/2007 | Copley |
| 2007/0101406 A1 | 5/2007 | Zavalkovsky et al. |
| 2007/0133576 A1 | 6/2007 | Tsuge et al. |
| 2007/0192863 A1 | 8/2007 | Kapoor et al. |
| 2007/0195780 A1 | 8/2007 | Cabeca et al. |
| 2007/0239999 A1 | 10/2007 | Honig et al. |
| 2007/0240215 A1 | 10/2007 | Flores et al. |
| 2007/0240216 A1 | 10/2007 | Flores et al. |
| 2007/0240217 A1 | 10/2007 | Tuvell et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2007/0283443 A1 | 12/2007 | McPherson et al. |
| 2008/0066151 A1 | 3/2008 | Thomsen et al. |
| 2008/0086773 A1 | 4/2008 | Tuvell et al. |
| 2008/0140795 A1* | 6/2008 | He et al. ............... 709/207 |
| 2008/0178294 A1* | 7/2008 | Hu et al. ............... 726/24 |
| 2008/0261598 A1 | 10/2008 | Tinnakornsrisuphap et al. |
| 2009/0013410 A1* | 1/2009 | Kaler et al. ............ 726/25 |
| 2009/0028116 A1 | 1/2009 | Beser |
| 2009/0254992 A1 | 10/2009 | Schultz et al. |
| 2011/0131650 A1* | 6/2011 | de los Reyes et al. ...... 726/22 |
| 2012/0066759 A1* | 3/2012 | Chen et al. ............ 726/15 |

OTHER PUBLICATIONS

U.S. Appl. No. 12/967,977, filed Dec. 14, 2010, entitled Multi-Service VPN Network Client for Mobile Device.

U.S. Appl. No. 11/697,647, filed Apr. 6, 2007, entitled Malware Detection System and Method for Mobile Platforms.

U.S. Appl. No. 13/166,376, filed Jun. 22, 2011, entitled Provisioning Layer Two Network Access for Mobile Devices.

"TNC IF-MAP Binding for SOAP" TCG Trusted Network Connect, Specification Version 2.0, Revision 36, Jul. 30, 2010, 69 pgs.

"Port-Based Network Access Control," IEEE Standard for Local and metropolitan area networks, IEEE Std 802.1X™—2004 (Revision of IEEE Std 802.1X—2001), Dec. 13, 2004, 72 pgs.

"TCG Trusted Network Connect, TNC IF-MAP binding for SOAP," Trusted Computing Group, Incorporated, Specification Version 1.0, Revision 25, Apr. 28, 2008, 50 pgs.

"Making NAC Security-Aware with IF-MAP," Interop Labs, Network Access Control Interoperability Lab, Metadata Access Point, Apr. 29, 2008, 2 pgs.

"Trusted Network Connect IF-MAP Announcement FAQ," Trusted Computing Group, Apr. 2008, 2 pgs.

"TNC IF-MAP Binding for SOAP," http://www.trustedcomputing-group.org, May 18, 2009, 99 pp.

* cited by examiner

DYNAMIC THREAT PROTECTION IN MOBILE NETWORKS

This application claims the benefit of U.S. Provisional Application No. 61/594,164, filed Feb. 2, 2012, the entire contents of which are incorporated herein by reference.

TECHNICAL FIELD

The invention relates to mobile networks and, more particularly, threat protection in mobile networks.

BACKGROUND

Use of cellular mobile devices for accessing computer data networks has recently increased dramatically. These mobile devices, often referred to as "smart" phones, provide a platform for both cellular phone calls and cellular-based access to computer data services. For example, a typical cellular radio access network (RAN), which may also be referred to as a "mobile core network" or "mobile core," is a collection of cells that each includes base stations capable of transmitting and relaying radio signals to subscribers' mobile devices. A "cell" generally denotes a distinct area of a cellular network that utilizes a particular frequency or range of frequencies for transmission of data. A typical base station is a tower to which are affixed a number of antennas that transmit and receive the data over the particular frequency. Mobile devices may transmit radio signals at the designated frequency to the base stations to initiate cellular telephone calls or packet-based data services. With respect to data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile devices at the base stations into Internet protocol (IP) packets for transmission within packet-based networks, such as the Internet.

With the increasing use of cellular mobile devices to access packet-based networks, malicious attackers (which may be commonly referred to as "hackers") have begun to shift the targets of their attacks from more traditional computing devices, such as desktop computers, workstations, laptop computers, and the like, to cellular mobile devices, such as the above-noted smart phones, cellular tablet or slate computers, and cellular e-book readers to name a few examples. The increase in malicious attacks with respect to cellular mobile devices has occurred, at least in part, as a result of users employing cellular mobile devices to access and/or conduct critical financial transactions (such as online banking transactions and/or e-commerce), where the malicious attacks seek to gain access to sensitive user information involved in these transactions (such as usernames and passwords, credit card numbers and other sensitive information commonly employed when conducting these types of transactions).

These attacks are commonly deployed using a "call-home" structure, where a malicious program may be surreptitiously loaded onto the cellular mobile devices and then, when loaded, contact a controlling agent that instructs the malicious program on future malicious actions to be taken. These malicious actions not only impact infected cellular mobile devices, compromising their security, but also may impact other cellular mobile devices in that the malicious communications between the malicious program and the controlling agent may consume bandwidth that could be utilized by the other cellular mobile devices for legitimate purposes. Loss of bandwidth may impact user experience and eventually lead to subscribers leaving the service provider that operates the mobile RANs to provide the cellular packet-based data services.

SUMMARY

In general, techniques are described for dynamic threat protection in mobile networks. The techniques may provide for dynamic threat protection through what may be referred to as a "feedback loop." A management system that manages mobile devices and at least one network security device, such as a firewall, may implement the techniques. The management system may receive reports of threats to the mobile network from one or more of the mobile devices. The management system may include a mobile device manager (MDM) and a network management system (NMS), where the MDM manages the mobile devices and the NMS manages the network security device. The MDM may pass these reports or some data derived from these report to the NMS using an information exchange server that manages a shared database, such as an interface for metadata access points (IF-MAP) server. The IF-MAP server features both a "push" and "pull" data model in which subscribers of the server, such as the NMS, may receive notifications of recently published information or request recently published information, respectively.

Through this information exchange server, the NMS may receive data describing the network threats and then dynamically, based on these reports, generate a security policy that specifies one or more actions to address the reported threats. The NMS installs these security policies in the network security device, which may then perform the actions specified in these security policies to address the threats. In this manner, the management system dynamically adapts operation of the network security devices to address threats reported by mobile devices. The network security device may reside between the mobile network and a public network, such as the Internet, so as to prevent threats from the public network that needlessly consume the bandwidth of the mobile network. As a result, the techniques may reduce malicious activity within the mobile network that may needlessly consume bandwidth, which is often scarce (and as a result, expensive to provide) in comparison to wired access networks, such as wired broadband networks.

In one embodiment, a network system comprises a mobile network that couples to a public network, at least one network security device positioned at the edge of the mobile network between the mobile network and the public network, a plurality of mobile devices that access the mobile network, and a management system. The management system includes a network server comprising a shared database, a mobile device manager (MDM) device that manages the plurality of mobile devices, and a network management system (NMS) that manages the at least one network security device. The MDM device includes at least one interface that receives a report message from one of the plurality of mobile devices, wherein the report message specifies a threat to the mobile network originating from the public network and a control unit that publishes the threat to the shared database. The NMS includes at least one interface that receives data from the shared database of the network server identifying the threat to the mobile network originating from the public network and a control unit that generates a security policy that specifies one or more actions to address the threat specified by the received data and installs the security policy in the at least one network security device so that the network security device performs the actions of the security policy to address the threat specified in the received message.

In another embodiment, a method comprises receiving, with a mobile device manager (MDM) of a management system that manages a plurality of mobile devices that access a mobile network, a report message from one of the plurality of mobile devices, wherein the report message specifies a threat to the mobile network originating from a public network to which the mobile network connects and publishing, with the MDM, the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report message.

In another embodiment, a mobile device manager (MDM) device of a management system that manages a plurality of mobile devices that access a mobile network comprises at least one interface that receives a report message from one of the plurality of mobile devices, wherein the report message specifies a threat to the mobile network originating from a public network to which the mobile network connects and at least one control unit that publishes the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report message.

In another embodiment, a non-transitory computer-readable medium comprising instructions that, when executed, cause one or more processors of a mobile device manager (MDM) device included within a management system to receive a report message from one of a plurality of mobile devices managed by the MDM device, wherein the report message specifies a threat to a mobile network originating from a public network to which the mobile network connects, and publish the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report message.

In another embodiment, a method comprises receiving, with a network management system (NMS) of a management system that manages at least one network security device positioned between a mobile network and a public network, data from a shared database in accordance with an interface for metadata access points (IF-MAP) standard, wherein the data identifies a threat to the mobile network originating from the public network to which the mobile network connects, and wherein the shared database is shared by a mobile device manager (MDM) of the management system and the NMS. The method also comprises generating, with the NMS, a security policy that specifies one or more actions to address the threat specified by the received data and installing, with the NMS, the security policy in the at least one network security device so that the network security device performs the actions of the security policy to address the threat specified in the received message.

In another embodiment, a network management system (NMS) of a management system that manages at least one network security device positioned between a mobile network and a public network comprises at least one interface that receives data from a shared database in accordance with an interface for metadata access points (IF-MAP) standard, wherein the data identifies a threat to the mobile network originating from the public network to which the mobile network connects, and wherein the shared database is shared by a mobile device manager (MDM) of the management system and the NMS. The NMS also comprises a control unit that generates a security policy that specifies one or more actions to address the threat specified by the received data and installs the security policy in the at least one network security device so that the network security device performs the actions of the security policy to address the threat specified in the received message.

In another embodiment, a non-transitory computer-readable medium comprising instructions that, when executed, cause one or more processors of a network management system (NMS) to receive data from a shared database in accordance with an interface for metadata access points (IF-MAP) standard, wherein the data identifies a threat to a mobile network originating from a public network to which the mobile network connects, and wherein the shared database is shared by a mobile device manager (MDM) and the NMS, generate a security policy that specifies one or more actions to address the threat specified by the received data and install the security policy in at least one network security device positioned between the mobile network and the public network so that the network security device performs the actions of the security policy to address the threat specified in the received message.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1A:
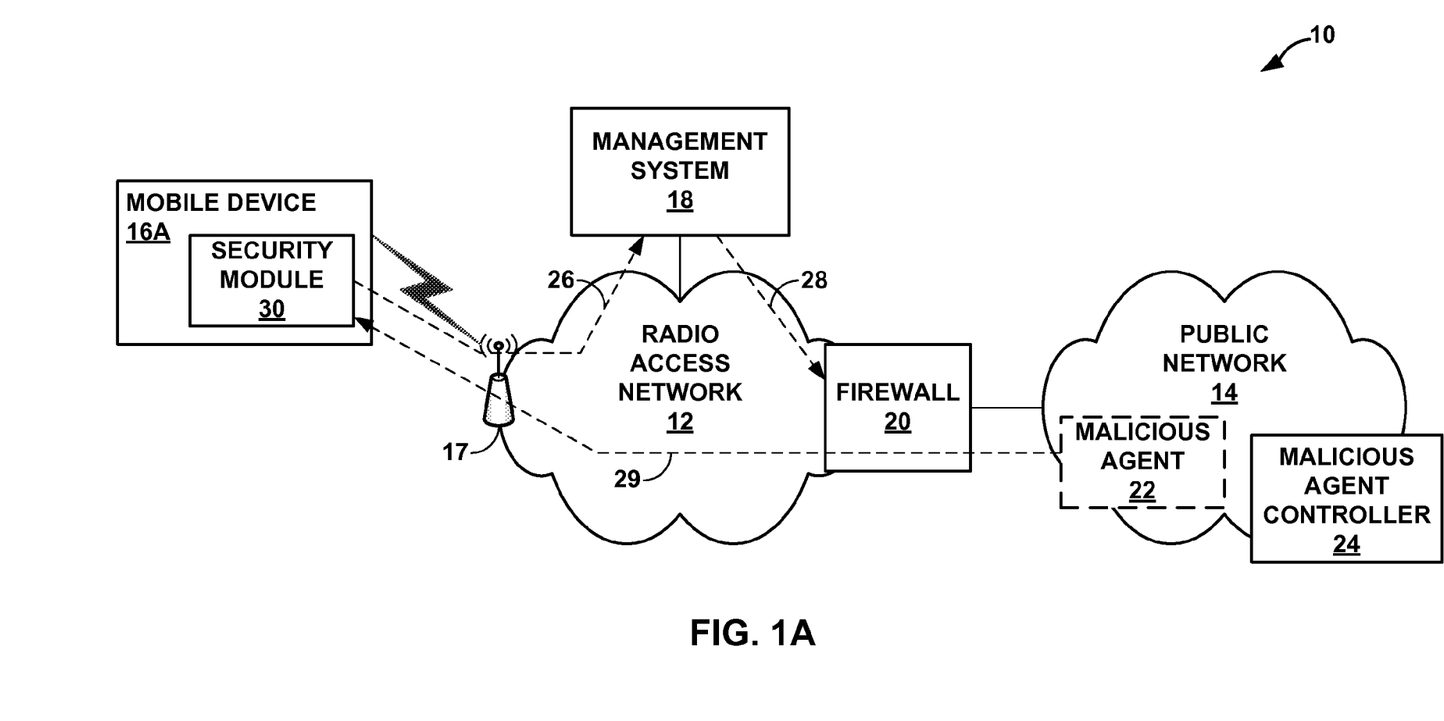
FIGS. 1A, 1B are block diagrams illustrating an exemplary network system that implements the techniques described in this disclosure.
Figure 1B:
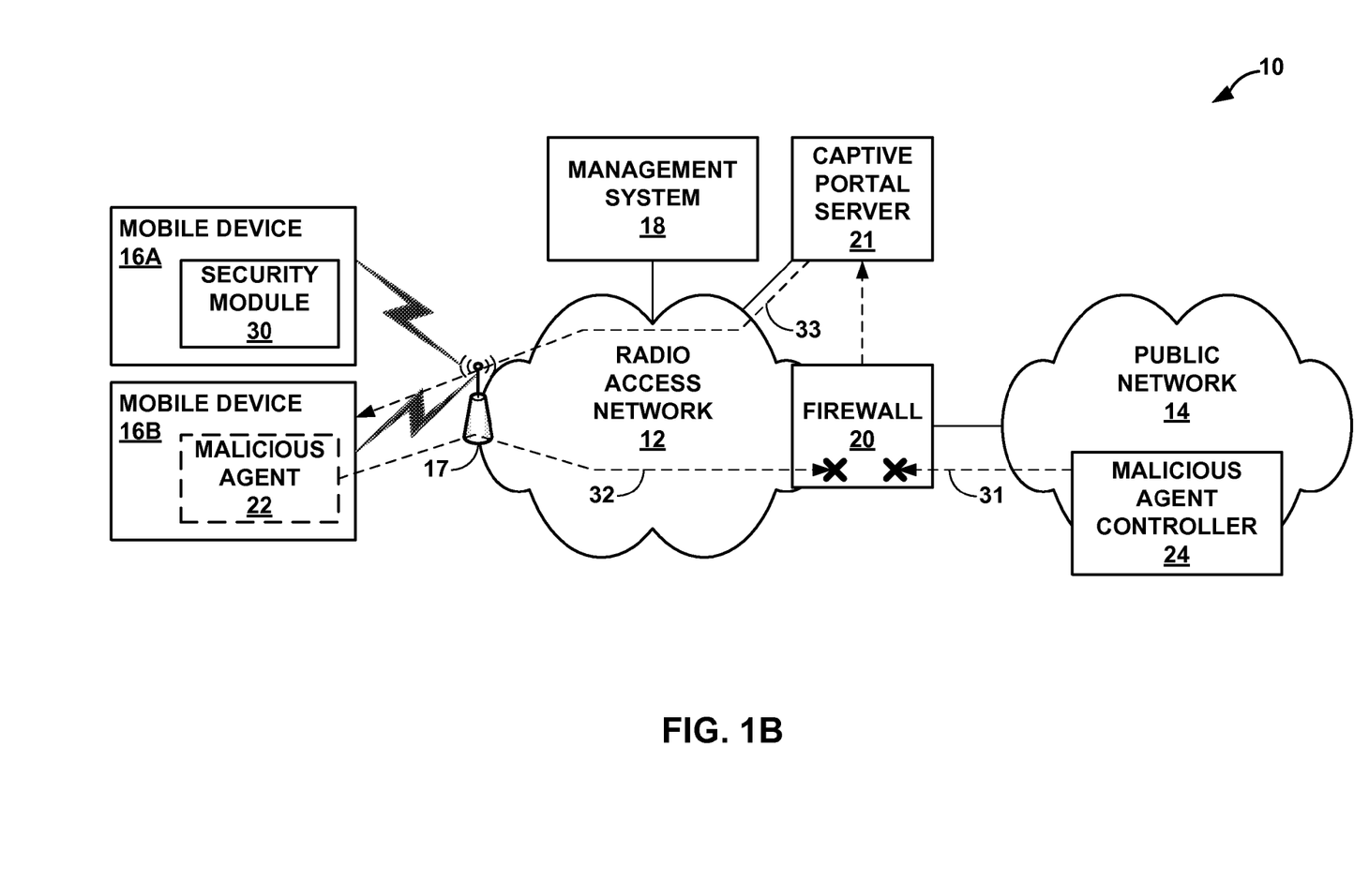

FIGS. 1A, 1B are block diagrams illustrating an exemplary network system 10 that implements the techniques described in this disclosure. Referring first to the example of FIG. 1A, network system 10 includes a radio access network 12 and a public network 14. Radio access network (RAN) 12 represents a network that implements a cellular network standard to facilitate wireless access by user equipment (UE), such as mobile device 16A, to a service provider's core network (CN), which is not shown in the example of FIG. 1A for ease of illustration purposes. Radio access network 12 may, for example, comprise a global system for mobile communication (GSM) radio access network that implements the GSM cellular standard, a universal mobile telecommunication system (UMTS) radio access network that implements a UMTS cellular standard or any other type of radio access network that implements a cellular standard.

More specifically, radio access network 12 may represent a collection of cells that each includes base stations, such as base station 17, capable of transmitting and relaying radio signals to mobile devices, such as mobile device 16A. The term "cell" generally refers to a distinct area of a cellular network that utilizes a particular frequency or range of frequencies for transmission of data. A typical base station is a tower to which are affixed a number of antennas that transmit and receive the data over the particular frequency in accordance with the cellular standard implemented by radio access network 12. Base station 17 represents an example of a typical base station. Mobile device 16A may transmit radio signals at the designated frequency to the base stations to initiate cellular telephone calls or packet-based data services. With respect to the packet-based data services, cellular service providers convert the cellular signals, e.g., Time Division Multiple Access (TDMA) signals, Orthogonal Frequency-Division Multiplexing (OFDM) signals or Code Division Multiple Access (CDMA) signals, received from mobile device 16A at the base stations into Internet protocol (IP) packets for transmission within packet-based networks, such as public network 14.

Public network 14 represents any network that is available to be generally accessed by the public. An exemplary public network 14 is the Internet, where public network 14 may represent the Internet as a whole or only a portion of the Internet. In any event, public network 14 may comprise an interconnected collection of network devices, such as routers, switches, hubs, servers, laptop computers, desktop computers, tablet or slate computers, mobile devices (including so-called "smart phones"), electronic reading devices, gaming devices, portable entertainment devices, and any other device that is capable of connecting to a network.

Increasingly, cellular service providers are adapting radio access networks, such as radio access network 12, to provide these packet-based data services to mobile devices, such as mobile device 16A, so that these mobile devices may access public network 14. As a result, new devices referred to as "smart phones" have been developed to make use of this relatively new form of packet-based data services. With the emergence of so-called smart phones that are capable of high-speed network access both via more traditional wired access networks (often, by way of wireless access points) and wireless access networks, such as radio access network 12, these mobile devices are capable of consuming greater amounts of content of various types (including text-, video-, and audio-based content) in comparison to traditional cellular phones. Cellular service providers, in response to this growth in smart phone usage, have further adapted radio access network 12 to manage increasing growth in smart phone usage and the associated high demand for packet-based data services.

To illustrate, in the example of FIG. 1A, network system 10 includes a management system 18, which the cellular service provider typically deploys to facilitate centralized management of mobile devices, such as mobile device 16A. Management system 18 represents one or more network devices that manage mobile devices, such as mobile device 16A. Management system 18 may secure, monitor, manage and support mobile devices deployed across mobile operators, service providers and enterprises. Typically, management system 18 may distribute over-the-air (or, in other words, via radio access network 12) applications, data and configuration setting for all types of mobile devices, such as mobile phones (including smart phones), tablet computers, laptop computers, electronic reading devices, or any other device capable of interfacing with radio access network 12. Mobile device 16A may generally represent any one of these types of mobile devices. In this manner, the cellular service provider may deploy management device 18 to centralize management of mobile devices coupled to radio access network 12.

In adapting radio access network 12 to support the growth in packet-based data services, cellular service providers have spent considerable amounts of capital, often in the form of new base stations and other equipment necessary to add additional "cells" to radio access network 12. In comparison to wired access networks, such as wired broadband networks, the capital outlays to adapt radio access network 12 typically far exceed those required to extend or improve a wired broadband network, making the cost per unit of bandwidth much greater in radio access network 12 compared to wired access networks. In this respect, bandwidth in radio access network 12 may be more valuable than bandwidth in wired access networks, which most cellular service providers also commonly operate as service providers. For this reason, cellular service providers may deploy network security devices to protect radio access network 12 from malicious attacks that may needlessly consume bandwidth in radio access network 12. Further details of an example radio access network of a service provider are described in U.S. patent application Ser. No. 13/247,357, "NETWORK ADDRESS PRESERVATION IN MOBILE NETWORKS," filed Sep. 28, 2011, the entire contents of which are incorporated herein by reference. In such an example, radio access network 12 may include a cellular network and a core network that interfaces to public network 14. Management system 18 may be deployed anywhere within the service provider network, such as with the core network, which may include other management components such as an Authentication, Authorization, and Accounting (AAA) server.

In the example of FIG. 1A, radio access network 12 includes a network security device in the form of firewall 20. The cellular service provider may deploy firewall 20 such that firewall 20 resides at the edge of radio access network 12 between radio access network 12 and public network 14. While described with respect to firewall 20, the techniques described in this disclosure may be implemented with respect to any network security device, such as an intrusion detection and prevention (IDP) device to name one alternative. Firewall 20, therefore, represents one example of a network security device. Firewall 20 may provide many security services, including port and/or address blocking, network address translation (NAT), and the like. Firewall 20 may implement network security policies to perform the network security operations. Typically, these network security policies are statically defined by network administrators to prevent perceived network vulnerabilities of radio access network 12.

Although shown in the example of FIG. 1A as connecting directly to public network 14, radio access network 12 may not directly connect to public network 14 but may connect to public network 14 via a backhaul network, such as a mobile backhaul network, positioned intermediately between radio access network 12 and public network 14. The network security device, e.g., firewall 20 in the example of FIG. 1A, may reside between this mobile backhaul network and public network 14 rather than reside at the edge of radio access network 12. Radio access network 12 may, in some instances, include or otherwise represent both a radio access network 12 and the mobile backhaul network. The techniques should therefore not be limited to the example of FIG. 1A, which for ease of illustration purposes, does not show a mobile backhaul network. Thus, the security device may be positioned at the public network-facing edge of radio access network 12, a mobile core-to-public network edge (where the mobile core includes both the radio access network and the mobile backhaul network) and/or the mobile core to partner network edge.

In some instances, management system 18 may manage or otherwise provide an interface by which to manage these network security policies implemented by firewall 20. In this respect, management system 18 may, in addition to providing a centralized management system for managing mobile device 16A, provide a centralized management system for managing network security devices, such as firewall 20. While shown as interfacing with firewall 20, management system 18 may manage other network security devices, which are not shown in the example of FIG. 1 for ease of illustration purposes.

Conventionally, static configuration of security policies within firewall 20 is sufficient to reduce malicious attacks, mostly because malicious attackers (which may be commonly referred to as "hackers") have not begun to seriously target mobile devices. Consequently, given the low volume of malicious attacks targeting mobile devices, administrators or other network security personnel may create and install security policies to combat the relatively few (in comparison to malicious attacks targeting more traditional networked computing devices, such as desktop computers, laptop computers, etc.) malicious attacks directed to mobile devices.

However, with the above described increasing use of cellular mobile devices to access packet-based networks, hackers have begun to shift the targets of their attacks from more traditional computing devices, such as desktop computers, workstations, laptop computers, and the like, to mobile devices, such as mobile device 16A. The increase in malicious attacks with respect to cellular mobile devices has occurred, at least in part, as a result of users employing cellular mobile devices to access and/or conduct critical financial transactions (such as online banking transactions and/or e-commerce), where the malicious attacks seek to gain access to sensitive user information involved in these transactions (such as usernames and passwords, credit card numbers and other sensitive information commonly employed when conducting these types of transactions). Additionally, with the increasing use of personal mobile cellular devices in the context of the enterprise, meaning users are increasingly employing their personal mobile cellular devices to access corporate or enterprise network, increases the risk that corporate data is accessible to the malicious agent.

These attacks are commonly deployed using a "call-home" structure, where a malicious program or agent, such as malicious agent 22, may be surreptitiously loaded onto mobile device and then, when loaded, contact a controlling agent residing in a public network 14, such as a malicious agent controller 24 included within public network 14, that instructs the malicious agent 22 on future malicious actions to be taken. Malicious agent 22 generally represents a software program that is controlled by malicious agent controller 24, where malicious agent 22 may interface or communicate with malicious agent control 24 to receive instructions directing a malicious attack. Malicious agent 22 may carry out these instructions to perform the malicious attack. Malicious agent 22 may perform any manner of malicious attack, from surreptitiously determining usernames, passwords, financial information (such as credit card numbers, expiration dates and security codes) and other personal data, providing this data to malicious agent controller 24 to participating in large-scale denial of service attacks, spam campaigns or any other form of malicious attack. Malicious agent controller 24 represents software commonly executed on hardware, such as a server or computer, that controls one or more malicious agents in performing these malicious actions or attacks.

These malicious actions not only impact infected cellular mobile devices, compromising their security, but also may impact other cellular mobile devices in that the malicious communications between the malicious program and the controlling agent may consume bandwidth that could be utilized by the other cellular mobile devices for legitimate purposes. Loss of bandwidth may impact user experience and eventually lead to subscribers leaving the service provider that operates the mobile RANs to provide the cellular packet-based data services. With the increase in malicious attacks, network administrators or other security personnel may be unable to specify security policies in sufficient time to prevent widespread malicious attacks from invading radio access network 12.

In accordance with the techniques described in this disclosure, management system 18 may provide dynamic threat protection in mobile networks. The techniques may provide for dynamic threat protection through what may be referred to as a feedback loop. Management system 18 may implement the techniques, where management system 18 may receive reports of threats to radio access network 12 from one or more of the mobile devices, such as report 26 from mobile device 16A. Management system 18 may then, based on these reports, generate a security policy, e.g., security policy 28, that specifies one or more actions to address the reported threats. Management system 18 installs these security policies in firewall 20, which may then perform the actions specified in these security policies to address the threats. In this manner, management system 18 dynamically (rather, than statically) adapts operation of firewall 20 to address threats reported by mobile device 16A. As a result, the techniques may reduce malicious activity within radio access network 12 that may needlessly consume bandwidth.

To illustrate, assume mobile device 16A accesses a website hosting malicious agent 22. A user operating mobile device 16A may instruct mobile device 16A to, for example, retrieve information 29 associated with an uniform resource locator (URL), where this information may include hypertext transfer protocol (HTTP) information specifying a webpage and malicious agent 22. Mobile device 16A may present the webpage, while also surreptitiously attempting to install malicious agent 22.

However, as shown in the example of FIG. 1A, mobile device 16A may include a security module 30 that identifies information 29 as a potential threat. That is, security module 30 may represent anti-virus software, anti-malware software, anti-spyware software, firewall software or any combination thereof that is capable of identifying viruses, malware, spyware and other malicious attacks, including malicious agent 22. Typically, security module 30 scans information 29, applying threat signatures to determine whether information 29 includes a malicious agent, such as malicious agent 22, prior to allowing malicious agent 22 to be installed within mobile device 16A. Yet, in some instances, security module 30 may not immediately identify malicious agent 22 when inspecting information 29, identifying malicious agent 22 as malicious only after malicious agent 22 attempts to communicate with malicious agent controller 24 (meaning malicious agent 22 may be installed).

Regardless of when malicious agent 22 is detected, upon detecting malicious agent 22, security module 30 may generate report 26 specifying the threat (e.g., malicious agent 22) to radio access network 12 originating from public network 14. Often, security module 30 specifies the threat in terms of ports and Internet protocol (IP) addresses to which malicious agent 22 is configured to use when communicating with malicious agent controller 24. Security module 30 may then communicate report 26 to management system 18. Management system 18 receives report 26 and generates security policy 28 that specifies one or more actions to address the threat specified in report 26. For example, management system 18 may parse the IP addresses and ports associated with malicious agent controller 24 from report 26 and form security policy 28 to specify that these IP address and ports should be blocked, meaning that communication originating from malicious agent controller 24 are dropped at firewall 20 before reaching radio access network 12 and all communication directed to malicious agent controller 24 are block so as to prevent the so-called "call home," effectively disabling malicious agent 22. Management system 18 may then install security policy 28 in firewall 20 so that firewall 20 performs the actions of the security policy to address the threat specified in report 26.

While described above with respect to a report message 26 (which may also be referred to as "report 26") that specifies IP addresses and ports associated with malicious agent controller 24, report 26 may specify any other information useful in forming security policies, such as security policy 28, in addition, or as an alternative, to IP address and ports. For example, security module 30 may identify the URL accessed when mobile device 16A retrieved information 29, including malicious agent 22, as well as a domain name system (DNS) name. Management system 18 may then generate security policy 28 such that all attempts to access this URL and/or DNS name are dropped. Likewise, while described with respect to IP addresses and ports, management system 18 may generate or form security policies based on the other information specified in report 26, such as the example URL and DNS name referred to above. Additionally, in some instances, more advanced security policies may be generated, one example of which is described in more detail with respect to FIG. 1B.

FIG. 1B is a block diagram illustrating network system 10 with the addition of mobile device 16B, which has been infected with malicious agent 22. In the example of FIG. 1B, it is assumed that mobile device 16B does not include security software, such as security module 30, and as a result, mobile device 16B was surreptitiously infected with malicious agent 22. Considering that firewall 20 has been dynamically updated with security policy 28, which would have prevented malicious agent 22 from access radio access network 12, it is further assumed that mobile device 16B was infected with malicious agent 22 while accessing public network 14 via a network not operated by the cellular service provider that operates radio access network 12, such as via an enterprise or other wired access network.

In any event, malicious agent 22 executing within mobile device 16B may periodically attempt to call home or otherwise communicate with malicious agent controller 24. This communication is illustrated in FIG. 1B as communication 32. Firewall 20 may implement its security policies, including security policy 28, to drop or perform some other action with respect to this communication 32. Typically, firewall 20 drops communication 32. In some instances, malicious agent controller 24 may attempt to communicate with malicious agent 22 to provide malicious agent 22 with additional instructions, where this communication is shown as communication 31 in the example of FIG. 1B. Once again, firewall 20 may implement security policy 28 to drop communication 31 or otherwise prevent communication 31 from reaching radio access network 12.

As noted above, management system 18 may generate and install more advanced security policies within firewall 20. One example of a more advanced security policy may specify actions per a particular class of mobile devices. For example, management system 18 may form security policy 28 such that when implemented by firewall 20, firewall 20 performs different actions for those mobile devices having installed a security module, such as security module 30, than those of mobile devices that have not yet installed security module 30.

To illustrate, assume mobile device 16B has not yet installed a security module 30 or downloaded malicious agent 22. Assuming mobile device 16A attempted to access information 29 (as shown in the example of FIG. 1A) and management system 18 has already installed security policy 28 specifying different actions for those mobile devices having installed security module 30 and those that have yet to install security module 30, when mobile device 16B attempts to access information 29, firewall 20 may apply security policy 28 to the attempt to access information 29. Security policy 28 may specify actions that firewall 20 performs upon successfully identifying malicious agent 22 as being associated with the access attempt. Firewall 20 may perform these actions to parse the IP address associated with mobile device 16B sent as a source IP address in the access attempt (which is often sent in the form of a packet). Using this IP address, firewall 20 may interface with management system 18, which may in turn interface with a billing, accounting or operation management system (not shown in the example of FIG. 1B for ease of illustration purposes) to determine whether the user operating mobile device 16B current pays for a security service supporting security module 30. This billing, accounting or operation management system may return an indication of whether the associated user subscribes to the security service, which management system 18 may forward to firewall 20. Based on this indication, firewall 20 may take one of two actions.

If the indication states that the associated user subscribes to the security service, firewall 20 may drop the packet. Thus, if mobile device 16A attempted to access information 29, firewall 20 may determine that the user of mobile device 16A currently subscribes to the security service in the manner described above and executes security module 30. As a result, firewall 20 may drop the packet requesting information 29. However, in the example noted above where it is assumed that mobile device 16B attempts to access information 29, firewall 20 may determine that mobile device 16B does not currently subscribe to the security service based on the indication from the billing, accounting or operations management system. If the indication states that the associated user does not subscribe to the security service, firewall 20 may redirect the communication to a captive portal, which may be hosted, for example, by a captive portal server 21. While shown as a separate device, captive portal server 21 may be incorporated into firewall 20 or any other device capable of hosting a captive portal. Captive portal server 21 may return captive portal 33 in response to the redirected access request. Captive portal 33 may, when presented by mobile device 16B, indicate that mobile device 16B attempted to access a malicious website or other resource and offer the user of mobile device 16B the opportunity to subscribe to the security software. In this manner, cellular service provider may increase sales of subscriptions to the security service while also strengthening the feedback loop in terms of report 26 generation and dynamic creation of security policies 28.

Figure 2:
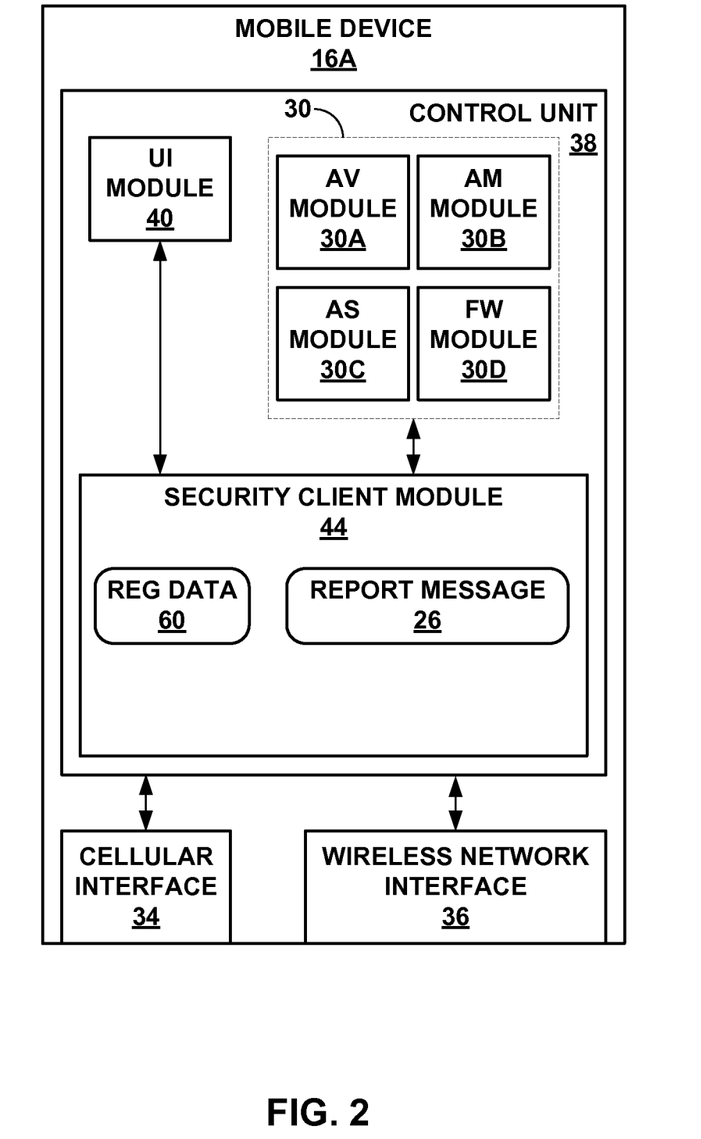
FIG. 2 is a block diagram illustrating the mobile device of FIG. 1 in more detail.

FIG. 2 is a block diagram illustrating exemplary mobile device 16A of FIG. 1 in more detail. As shown in the example FIG. 2, mobile device 16A includes a cellular interface 34, a wireless network interface 36 and a control unit 38. Cellular interface 34 represents an interface by which mobile device 16A may wirelessly communicate with radio access network 12. Typically, cellular interface 34 implements one or more of the common mobile or cellular phone standards, such as standards proposed by the $3^{rd}$ Generation Partnership Project (3GPP), 3GPP2, or any other mobile telecommunication or technology standards body. Cellular interface 34 may also implement one or more mobile phone services, where such mobile phone services may include a general packet radio service (GPRS), enhanced data rates for global system for mobile communications (GSM) evolution (EDGE) service, universal mobile telecommunication systems (UMTS) service, code division multiple access (CDMA) 2000 service (which is commonly referred to as "CDMA2000"), CDMA2000 1x evolution-data optimized (which is often referred to as "CDMA2000 1xEV-DO") or any other service provided in accordance with common mobile telecommunication or technology standards. Wireless network interface 36 may represent an interface by which mobile device 18 may wirelessly communicate with a local area network (LAN) or a wide area network (WAN). Wireless network interface 36 may implement one or more of the IEEE 802.11 standards, such as one or more of the IEEE 802.11a standard, IEEE 802.11b standard, IEEE 802.11g standard and IEEE 802.11n standard, as well as early 802.11 standards and any successors.

Control unit 38 may represent one or more processors (not shown in FIG. 2) that execute software instructions, such as those used to define a software or computer program, stored to a non-transitory computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 38 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein. Further details of an example mobile device providing integrated security services are described within U.S. patent application Ser. No. 12/967,977, entitled "MULTI-SERVICE VPN NETWORK CLIENT FOR MOBILE DEVICE," filed Dec. 14, 2011, incorporated herein by reference.

Control unit 38 includes a user interface (UI) module 40 ("UI module 40"), security modules 30, and a security client module 44. UI module 40 may represent a module with which a user may interface to interact with mobile device 18. Commonly, UI module 40 presents one or more command line interfaces (CLIs), graphical user interfaces (GUIs) or any other type of UI with which a user interface to input data and receive data from mobile device 18. As shown in the example of FIG. 2, security modules 30 comprise an anti-virus (AV) module 30A ("AV module 30A"), an anti-malware (AM) module 30B ("AM module 30B"), an anti-spam (AS) module 30C ("AS module 30C") and a firewall (FW) module 30D ("FW module 30D"). AV module 30A represents a module that analyzes data stored to mobile device 18 using anti-virus signatures to detect the presence of viruses within mobile device 18. AM module 30B represents a module that analyzes data stored to mobile device 18 using a number of techniques including anti-malware signatures to detect the presence of so-called "malware" within mobile device 18, where the term "malware" is commonly used to denote "malicious software." AS module 30C represents a module that analyzes SMS and email messages sent from and to mobile device 18 using anti-spam policies to detect "spam", where "spam" refers to undesirable and potentially malicious SMS or email messages. The transmission of "spam" messages may be blocked by AS module 30C. FW module 30D represents a module that performs operations similar to those described above with respect to firewall 20 shown in the example of FIG. 1. FW module 30D may, for example, block connections from public network 14 to mobile device 18 if those connections do not originate from mobile device 18. Security client module 44 represents a module that manages the security state of mobile device 18. Further details of example techniques for applying virus and malware security software within a mobile device are described within U.S. patent application Ser. No. 11/697,647, entitled "MALWARE DETECTION SYSTEM AND METHOD FOR MOBILE PLATFORMS," filed Apr. 6, 2007, incorporated herein by reference.

Security client module 44 of mobile device 16A may register with management system 18, which then provides configuration information to configure current modules of mobile device 16A. For example, management device 18 may, upon registering mobile device 16A, provide configuration information configuring one or more of AV module 30A, AM module 30B, AS module 30C and FW module 30D. This configuration information may enable one or more of these modules 30 or otherwise provide signatures and other information necessary to facilitate the operation of these modules 30.

To register mobile device 16A, security client module 44 collects registration data 60 ("reg data 60"). Registration data 60 may include a phone number associated with mobile device 18 and the IMEI, IMSI or any other data commonly provided to register a mobile device with a network device or cellular devices (such as base station 17 shown in the example of FIG. 1). Registration data 60 may also include authentication credentials of the user operating device 16A, such as those provided to perform authentication in accordance with the 802.1X standard. Security client module 44 then transmits registration data 60 to management system 18 via cellular interface 34.

In response to registering with management system 18, mobile device 16A may receive a registration message from management system 18 indicating that mobile device 16A has successfully or unsuccessfully registered with management system 18. Assuming mobile device 16A successfully registers with management system 18, subsequent messages from management system 18 may specify which ones of security modules 30 are enabled or activated, while also providing information to update, de-activate and/or configure various ones of security modules 30. More information regarding registration and other interactions with a management system 18, such as a mobile security gateway (MSG), may be found in U.S. application Ser. No. 13/166,376, filed Jun. 22, 2011, the entire contents of which are hereby incorporated by reference as if set forth in its entirety herein.

In accordance with the techniques of this disclosure, a user may interface with UI module 40 to interface with control unit 38 so as to communicate with public network 14 via cellular interface 34. These communications may involve use of cellular packet-based data services to which the user has subscribed and may comprise IP packets. The user may attempt to access information 29, which includes malicious agent 22. Assuming firewall 20 has not been updated at this point to detect the threat in the form of malicious agent 22, firewall 20 may permit information 29 to traverse radio access network 12, resulting in mobile device 16A receiving this information 29 via cellular interface 34. Prior to presenting this information 29 (and surreptitiously installing mobile agent 22, control unit 38 may first invoke one or more of security modules 30 to scan or otherwise analyze information 29 for security threats.

One or more of security modules 30 may each perform their separate analysis of information 29, where AM module 30B may, for example, detect malicious agent 22 within information 29 as malicious software. AM module 30B may then inform security client module 44 of the security threat in the form of malicious agent 22. Security client module 44 may then generate a report message 26 based on the identified threat. In this instance, AM module 30B may provide a IP address and/or protocol/port associated with the server hosting information 29, a URL associated with information 29, a copy of malicious agent 22 or any other information associated with or describing the threat (which in this instance is malicious agent 22). Security client module 44 may generate report message 26 to include this threat description (either in its entirety as provided by AM module 30B or partially, where some of this threat description is filtered or removed). Security client module 44 may then transmit report message 26 via cellular interface 34 to management system 18.

To illustrate, security client module 44 may, after processing information 29, generate DNS names, IP addresses, URLs and signatures associated with one or more so-called "command and control centers" that direct and/or otherwise controlled the malicious agents when these malicious agents "call home" to these command and control centers. Security client module 44 may generate report message 26 to include these DNS names, IP addresses, URLs and signatures so that a security policy can be generated that not only drops the connection/packets to the URL and server serving the malicious data but also sever any other connections these types of malicious agents may attempt to establish to public network 14.

In this manner, a mobile device may be adapted in accordance with the techniques to provide report messages describing threats to a management system. By providing report messages having detailed threat descriptions, the techniques may enable feedback with respect to threats to radio access networks from a public network. As described in more detail below, the management system may employ this feedback to dynamically create security policies, which can then be installed in one or more network security devices to prevent this threat from entering the mobile network (i.e., radio access networks, as one example).

Figure 3:
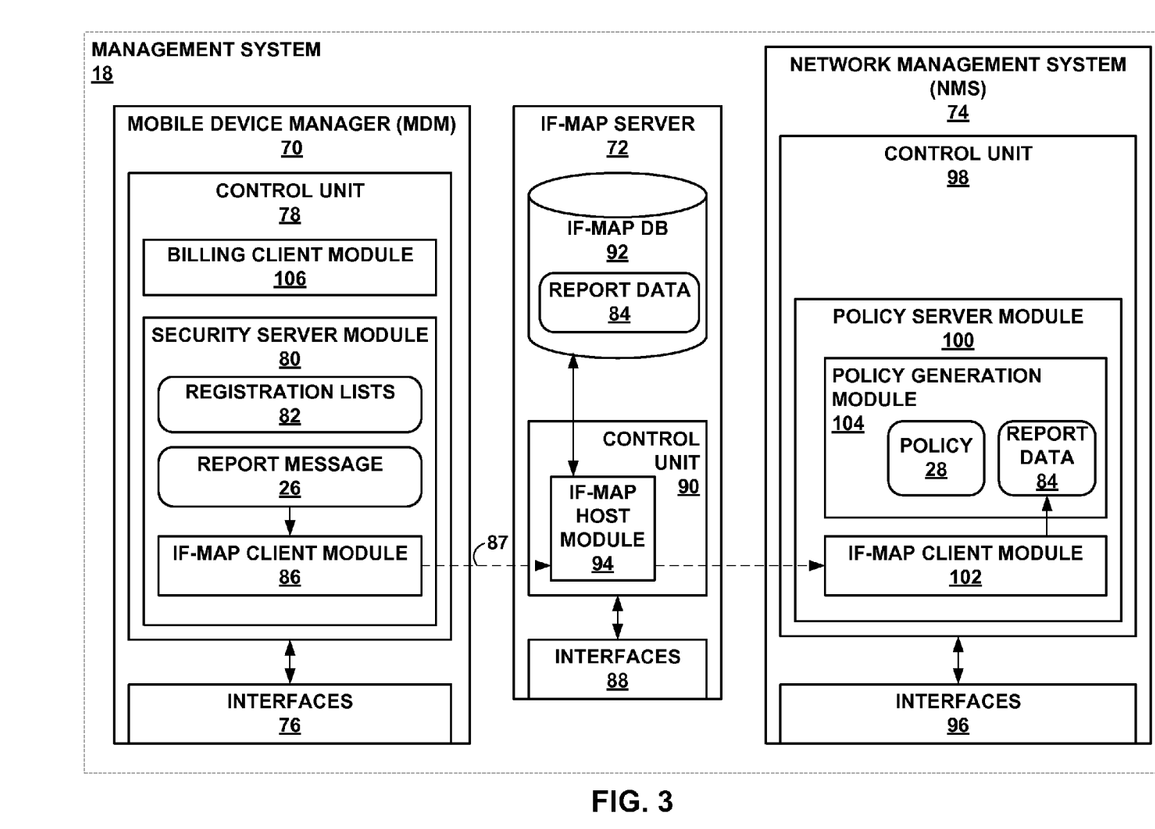
FIG. 3 is a block diagram illustrating the management system of FIG. 1 in more detail.

FIG. 3 is a block diagram illustrating management system 18 of FIG. 1 in more detail. In the example of FIG. 3, management system 18 includes a mobile device manager (MDM) device 70 ("MDM 70"), an interface for metadata access points (IF-MAP) server 72 ("IF-MAP server 72") and a network management system (NMS) 74. While shown as comprising separated devices, i.e., MDM 70, IF-MAP server 72 and NMS 74 in the example of FIG. 3, management system 18 may implement the functionalities attributed to each of these devices in a single device or two or more devices. The techniques therefore should not be limited to the example management system 18 shown in the example of FIG. 3, but may be implemented by any number of devices, including a single device.

MDM 70 represents a network device that manages mobile devices communicating with radio access networks of a cellular service provider, such as radio access network 12 shown in the examples of FIGS. 1A, 1B. In the example of FIG. 3, MDM 70 includes interfaces 76 and control unit 78. Interfaces 76 typically include wired interfaces, but may include interfaces that are substantially similar to cellular interface 34 and wireless network interface 36. Control unit 78 may be substantially similar to control unit 38 described above with respect to the example of FIG. 2. Control unit 78 includes a security server module 80 that validates the security state of mobile devices, such as mobile device 16A, and otherwise manages security module 30. Again, more information concerning security server module 80 may be found in the above incorporated U.S. application Ser. No. 13/166,376, filed Jun. 22, 2011.

As noted above, security client module 44 of mobile device 16A (shown in the example of FIG. 2) may register with MDM 70, which then provides configuration information to configure current modules of mobile device 16A. For example, MDM 70 may, upon registering mobile device 16A, provide configuration information configuring one or more of AV module 30A, AM module 30B, AS module 30C and FW module 30D. This configuration information may enable one or more of these modules 30 or otherwise provide signatures and other information necessary to facilitate the operation of these modules 30. MDM 70 stores data defining registration lists 82. Registration lists 82, as noted above, may define a list of registered mobile devices. One or more of registration lists 82 may be associated with radio access network 12 and define mobile devices that are available to access radio access network 12.

As noted above, mobile device 16A may detect security threats (i.e., in the form of malicious agent 22 in the examples described in this disclosure) and generate report message 26 detailing or specifying this threat. Mobile device 16A may invoke security client module 44, which may generate report message 26 based on threat information (which may be referred to as a "threat description") transmitted by the detecting one of security modules 30. Security client module 44 may forward report message 26 via cellular interface 34 to MDM 70, which in turn, may invoke security server module 80 to handle or otherwise process report message 26. Security server module 82 may process report message 26, parsing report data 84 from report message 26. Report data 84 may comprise the threat description provided by the detecting one or more of security modules 30 either in its entirety or after having been filtered to remove redundant or other information.

As further shown in the example of FIG. 3, security server module 80 includes IF-MAP client module 86, which represents a module that implements the IF-MAP protocol to generate IF-MAP messages. These IF-MAP messages may request data stored to an IF-MAP database (DB) or publish data to the IF-MAP DB. More information concerning the IF-MAP protocol may be found in an IF-MAP specification, entitled "TNC IF-MAP Binding for SOAP," Specification Version 2.0, Revision 36, dated Jul. 30, 2010, the entire contents of which are hereby incorporated by reference as if set forth in its entirety herein. Security server module 80 may invoke IF-MAP client module 86 to generate an IF-MAP message 87 for publishing report data 84 to IF-MAP server 72. IF-MAP client module 86 may then forward IF-MAP message 87 to IF-MAP server 72 via one of interfaces 76.

IF-MAP server 72 includes interfaces 88 that may be substantially similar to interfaces 76 of MDM 70 and a control unit 90 that may be substantially similar to control unit 78 of MDM 70. IF-MAP server 72 also includes an IF-MAP database (DB) 92 ("IF-MAP DB 92"). IF-MAP database 92 represents a database that stores data in accordance with an IF-MAP protocol. Control unit 90 includes an IF-MAP host module 94, which represents a module that implements the IF-MAP protocol to process IF-MAP publish messages, such as IF-MAP message 87, and generate IF-MAP messages in response to IF-MAP query messages. In this example, IF-MAP host module 94 receives IF-MAP publish message 87 via one of interfaces 88, processes IF-MAP publish message 87 to extract report data 84 and stores report data 84 to an entry of IF-MAP database 84. In some instances, IF-MAP database 80 may have to create a new entry prior to publishing report data 84 to IF-MAP database 92.

By publishing report data 84 to IF-MAP DB 92, MDM 70 provides a way by which one or more NMSes, such as MNS 74, may access data defining threat descriptions without having to implement a proprietary protocol. Moreover, the IF-MAP protocol provides both for a "pull" and a "push" model of data access. That is, in the pull model, IF-MAP server 72 may provide data only in response to an IF-MAP request message requesting that data. In the push model, IF-MAP server 72 pushes or, in other words, forwards data (often, selectively in terms that the push data must meet some certain criteria, such as being published by a trusted peer) to subscribers of this type of data. Using this push model, IF-MAP server 72 may push any data from MDMs, such as MDM 70, to NMSes, such as NMS 74, without any of the NMSes having to actively request this data. This push model may be periodic (meaning, IF-MAP server 72 may push any data published prior to the last push on a periodic basis) or continuous (meaning, IF-MAP server 72 may push data as soon as the data is published). Regardless, IF-MAP server 72 may store report data 84 for later consumption by NMS 74.

As yet further shown in the example of FIG. 3, NMS 74 includes interfaces 96 that may be substantially similar to interfaces 76 of MDM 70 and interfaces 88 of IF-MAP server 72. NMS 74 also includes control unit 98, which may be substantially similar to control units 78 and 90 of MDM 70 and IF-MAP server 72, respectively. Control unit 98 includes a policy server module 100, which represents a module for generating and then distributing or installing security policies to or within network security devices, such as firewall 20 shown in the example of FIGS. 1A, 1B.

Policy server module 100 includes an IF-MAP client module 102, which may be substantially similar to IF_MAP client module 86 of MDM 70, and a policy generation module 104. Policy generation module 104 represents a module that dynamically generates security policies, such as security policy 28, based on report data, such as report data 84. Policy server module 100 may, in some instances, periodically invoke IF-MAP client module 102 to generation an IF-MAP request message requesting report data 84 newly published since the last request. Alternatively, policy server module 100 may subscribe to IF-MAP server 72 using the push model, where IF-MAP host module 94 may push report data 84 to IF-MAP client module 102, upon report data 84 being published by MDM 70. Regardless, IF-MAP client module 102 may retrieve report data 84, forwarding report data 84 to policy generation module 104.

While described in this disclosure with respect to IF-MAP, other similar types of protocols or application programming interfaces (APIs) for publishing and/or retrieving data may be employed to facilitate implementation of the techniques described in this disclosure. One other API that may be used, for example, includes a representation state transfer (REST)-ful (RESTful) APIs. REST generally defines a set of architectural principles by which Web services may be defined that focus on a system's resources, including how resource states are addressed and transferred over hypertext transfer protocol (HTTP) by a wide range of client written in different languages. These RESTful APIs may therefore operate in accordance with these architectural principles to facilitate the exchange of state data, such as the report data identifying security risks to radio access network 12. The techniques therefore should not be limited to IF-MAP but may generally employ any form of protocol or API that facilitates the exchange of data between two or more devices.

Policy generation module 104 may then generate policy 28 based on report data 84. An example of policy 28 is provided in the following Table 1.

TABLE 1

| Source Zone | Destination Zone | Source IP Address | Destination IP Address | Application | Action |
|---|---|---|---|---|---|
| Trusted | Untrusted | Any | Any | Any | Block URL 1 |

In the example of Table 1, policy 28 specifies that any communication from a trusted source zone, such as mobile device 16A, to an untrusted zone, such as public network 14, having any source IP address and any destination IP address and associated with any application is blocked if the communication contains URL 1. URL 1 may be specified as report data 84.

As noted above, there are a number of variations of policies. In some examples, either MDM 70, when publishing report data 84, or policy generation module 104, when analyzing report data 84, may assign a reputation, rank or score to various aspects of report data 84, such as an URL. This reputation, rank or score may comprise a number on a scale of one to 100. Policy generation module 104 may then generate policies that utilize this reputation, rank or score. Another example of policy 28 that incorporates reputation, rank or score is provided in the following Table 2.

TABLE 2

| Source Zone | Destination Zone | Source IP Address | Destination IP Address | Application | Action |
|---|---|---|---|---|---|
| Trusted | Untrusted | Any | Any | Any | Block any URLs having rep < 50. |

In the example of Table 2, policy 28 specifies the same source zone, destination zone, source IP address, destination IP address and application as that provided in Table 1. The difference between policy 28 of Table 1 and policy 28 of Table 2 is the action, where policy 28 shown in the example of Table 2 blocks any URLs having a reputation ("rep") less than 50.

As noted above, management system 18 may generate policy 28, in some examples, that redirect access by a mobile device that does not subscribe to a security service (such as mobile device 16B shown in the example of FIG. 1B) to a URL, such as URL 1, to a captive portal 33. An example of this form of policy 28 is provided in the following Table 3.

TABLE 3

| Source Zone | Destination Zone | Source IP Address | Destination IP Address | Application | Action |
|---|---|---|---|---|---|
| Trusted | Untrusted | Unsecured | Any | Any | If URL 1, redirect to captive portal |
| Trusted | Untrusted | Secured | Any | Any | Block URL 1 |

In the example of Table 3, policy 28 specifies that any communication from a trusted source zone to an untrusted source zone having an unsecured source IP address and destined for any destination address, where the communication is associated with any application and contains URL 1, is redirected to captive portal 33. Policy 28 shown in the example of Table 3 also specifies that any communication from a trusted source zone to an untrusted source zone having an secured source IP address and destined for any destination address, where the communication is associated with any application and contains URL 1, is blocked. While a number of example policies are described in detail above for purposes of explanation, the techniques may not require that all policies correspond to the particular examples above in terms of form and content but may be implemented with respect to any form of security policy commonly deployed by network security devices.

To determine whether a source IP address is secured or unsecured and thereby properly apply policy 28, firewall 20, when implementing this example of policy 28 may issue a request to NMS 74. This request specifies a source IP address associated with the access attempt and requests security subscription information that specifies whether the provided source IP address subscribes to a security service offered by the cellular service provider. NMS 74 receives this request and forwards this request to MDM 70, where control unit 78 of MDM 70 invokes a billing client module 106. That is, control unit 78 includes a billing client module 106 that provides an interface between MDM 70 and backend billing, accounting and/or operation management system that maintains user/device billing, accounting, profile and/or other operations information.

Billing client module 106 may process or "handle" the request from firewall 20, issuing a request to this backend billing, accounting and/or operation management system requesting service subscription information associated with the source IP address provided in the request. This system, which is not shown for ease of illustration purposes, may perform a lookup using the IP address provided in the request to retrieve service subscription information and provide this service subscription information to billing client module 106. Billing client module 106 may then forward this service subscription information via NMS 74 to firewall 20, which may then determine whether to redirect the session to captive portal 33 or block the communication based on the service subscription information. To illustrate, when firewall 20 determines that the service subscription information indicates that mobile device 16A subscribes to the above noted security service, firewall 20 blocks the communication. However, when firewall 20 determines that service subscription information indicates that mobile device 16B does not subscribe to the above noted security service, firewall 20 redirects the session to captive portal 33.

Figure 4:
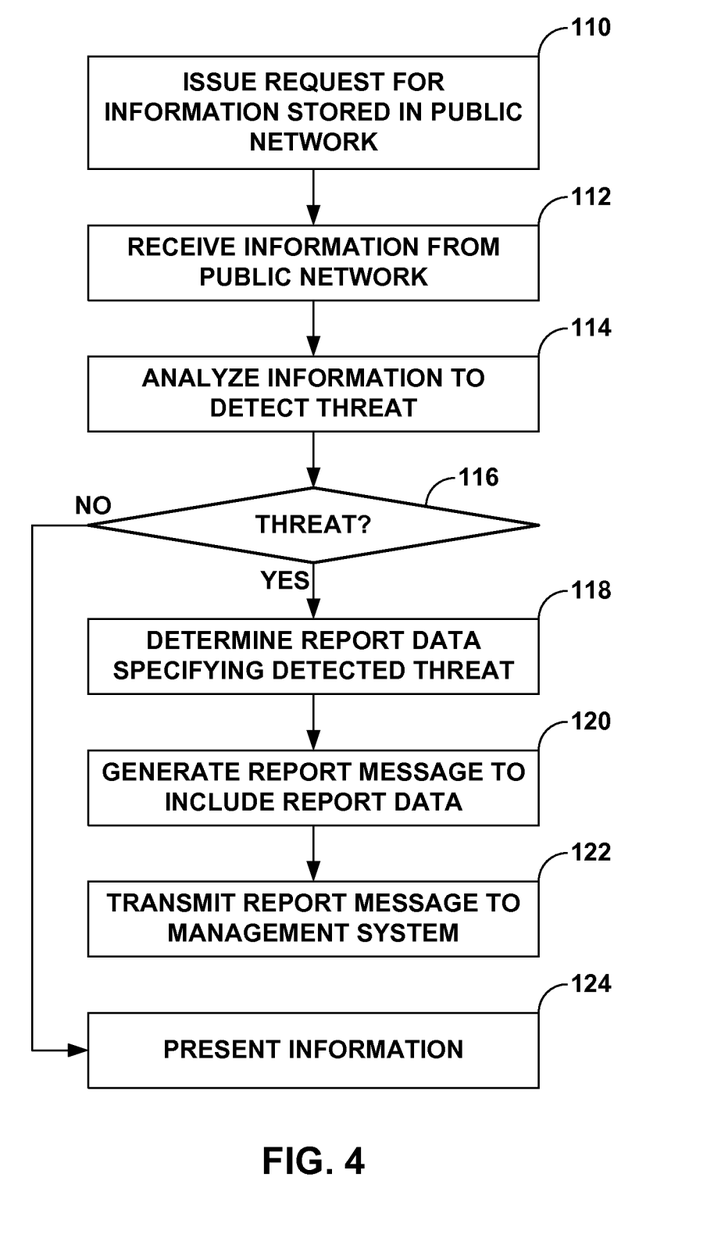
FIG. 4 is a flowchart illustrating exemplary operation of a mobile device in implementing various aspects of the techniques described in this disclosure.

FIG. 4 is a flowchart illustrating exemplary operation of a mobile device, such as mobile device 16A shown in the example of FIG. 2, in implementing various aspects of the techniques described in this disclosure. While described with respect to a particular mobile device, i.e., mobile device 16A in this example, the techniques described below may be implemented by any type of mobile device, including those listed above.

Initially, mobile device 16A may issue a request for information 29 stored in public network 14 (110). This request may comprise an HTTP request message requesting content associated with a website or any other request for information stored to public network 14. Assuming firewall 20 has not been previously configured to block this information, public network 14 returns information 29 in response to the request. Mobile device 16A therefore receives information 29 from public network 14. Mobile device 16A may, prior to presenting information 29 via UI module 40 for consumption by the user of mobile device 16A, invoke one or more of security models 30 to analyze information 29 in order to detect a potential threat (114).

If one or more of security modules 30 detects a threat, for example, in the form of malicious agent 22 embedded within information 29 ("YES" 116), the threat is forwarded to security client module 44, which determines report data 84 specifying the detected threat and generates report message 26 to include report data 84 in the manner described above (118, 120). Security client module 44 then transmits report message 26 to management system 18 (122). However, if none of security modules 30 detects a threat ("NO" 116), security client module 44 may forward information 29 to the responsible application (such as a web browser application), which presents information 29 via user interface module 40 to the user of mobile device 16A (124).

Figure 5:
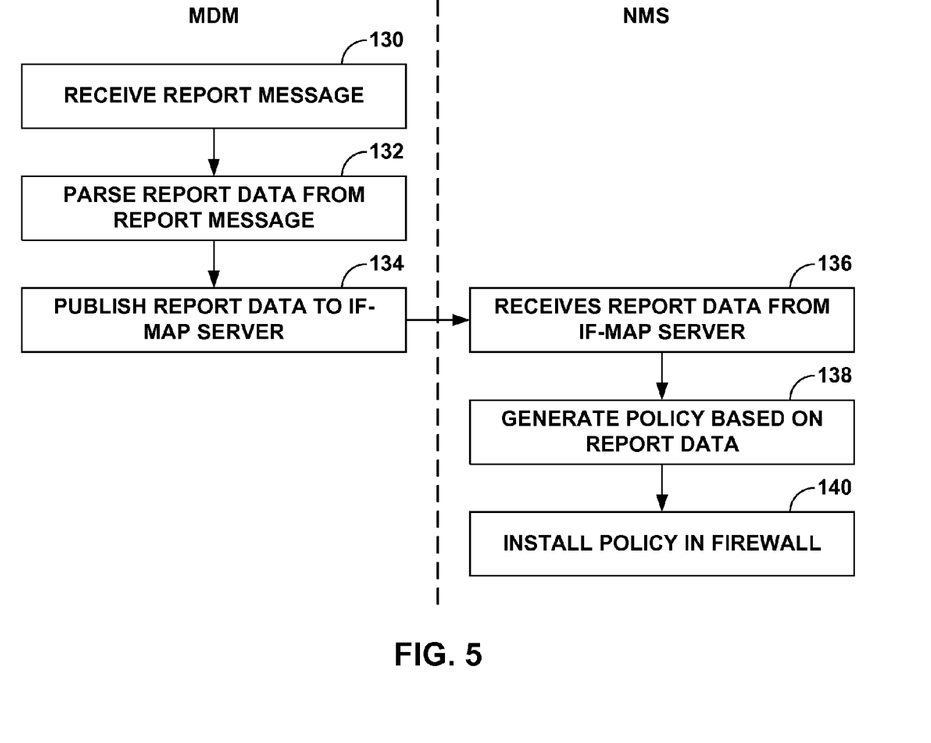
FIG. 5 is a flow chart illustrating example operation of a management system in implementing various aspects of the techniques described in this disclosure.

FIG. 5 is a flow chart illustrating example operation of a management system, such as management system 18 shown in the example of FIG. 3, in implementing various aspects of the techniques described in this disclosure. Again, while described with respect to a particular management device, i.e., management device 18 in this example, the techniques described below may be implemented by any type of management device, including those that include a single device or multiple devices.

Initially, management device 18 receives report message 26 via one of interfaces 76 from a mobile device, such as mobile device 16A (130). Control unit 78 of MDM 70 included within management system 18 may invoke security server module 80 in response to report message 26. Security server module 80 parses report data 84 from report message 26 (132). Security server module 80 then invokes IF-MAP client module 86, passing report data 84 to IF-MAP client module 86. IF-MAP client module 86 generates an IF-MAP publish message to include report data 84 and transmits this IF-MAP publish message to IF-MAP server 72. In this manner, IF-MAP client module 86 publishes report data 84 to IF-MAP server 72 (134).

Via either the pull model or the push model described above as implemented by IF-MAP client module 102, NMS 74 receives report data 84 (136). In response to receiving report data 84, control unit 98 of NMS 74 invokes policy server module 100 to process report data 84. Policy server module 100, in turn, invokes policy generation module 104, which generates policy 28 based on report data 84 in the manner described above (138). Policy server module 100 then installs policy 28 in firewall 20 (140).

While described above with respect to a wireless access network, the techniques of this disclosure may also be implemented with respect to wired access networks. For example, cellular service providers have begun to deploy wireless access points in public places (where these public wireless access points are commonly referred to as "hotspots") so as to offload traffic from the mobile network (such as radio access network 12) onto wired access networks. These wired access networks to which the mobile devices connect wirelessly via wireless access points may likewise be protected from public network 12 by a network security device, which may be similar to firewall 20. The techniques may be deployed such that management system 18 receives reports via the wired access network and provisions network security devices protecting not only a mobile network or wireless access network but also wired access networks. The techniques may be implemented such that threats detected when connected to public network 14 via a wired access network are communicated to management system 18 so that policies are deployed to combat these threats in network security devices protecting wireless access networks and vice versa (meaning threats detected when connected via wireless access network are used to dynamically generate policies that are then installed in network security devices protecting wired access networks).

Various embodiments of the invention have been described. These and other embodiments are within the scope of the following claims.

The invention claimed is:

1. A network system comprising:
a mobile network that couples to a public network;
a plurality of mobile devices that access the mobile network;
at least one network security device positioned upstream from the mobile devices at the edge of the mobile network and between the mobile network and the public network; and
a management system that includes:
a network server comprising a shared database; and
a mobile device manager (MDM) device that manages the plurality of mobile devices,
wherein the MDM device includes:
at least one interface that receives a report message from one of the plurality of mobile devices, wherein the report message specifies a threat to the mobile network originating from the public network; and
a control unit that publishes the threat to the shared database; and
a network management system (NMS) that manages the at least one network security device,
wherein the NMS includes:
at least one interface that receives data from the shared database of the network server identifying the threat to the mobile network originating from the public network; and
a control unit that generates a security policy that specifies one or more actions to address the threat specified by the received data and installs the security policy in the at least one network security device so that the network security device performs the actions of the security policy to address the threat specified in the received message.

2. The network system of claim 1,
wherein the network server comprises an interface for metadata access points (IF-MAP) server that provides access to the shared database in accordance with an IF-MAP standard,
wherein the control unit of the MDM device publishes the threat to the shared database in accordance with the IF-MAP standard, and
wherein the at least one interface of the NMS receives the data from the shared database in accordance with the IF-MAP standard.

3. The network system of claim 1,
wherein the MDM device is one of a plurality of MDM devices,
wherein the plurality of MDM devices each receive report messages that specify threats to the mobile network originating from the public network from mobile devices managed by each of the plurality of MDM devices and publish the threats to the shared database,
wherein the NMS is one of a plurality of NMS devices,
wherein each of the plurality of NMS devices manages at least one network security device;
wherein each of the plurality of NMS devices receives data from the shared database of the network server identifying the threats to the mobile network originating from the public network, generate security policies that specify one or more actions to address the threats specified by the received data and installs the security policies in the respective ones of the network security devices so that the network security devices perform the actions of the security policy to address the threat specified in the received message.

4. The network system of claim 1,
wherein the report message specifies the threat to the mobile network in terms of a ranking that indicates a severity of the threat to the mobile network,
wherein the control unit of the MDM device publishes the ranking to the shared database,
wherein the data received from the shared database by the at least one interface of the NMS includes the ranking, and
wherein the control unit of the NMS further determines the one or more actions specified in the security policy based on the ranking.

5. The network system of claim 1, wherein the one or more actions comprise redirecting a session identified as involved in the threat to a captive portal hosted by the mobile network to offer one or more services to one of the plurality of mobile devices participating in the session.

6. The network system of claim 5,
wherein redirecting the session identified as involved in the threat to the captive portal comprises redirecting the session identified as involved in the threat to the captive portal to offer a security service to the one of the plurality of mobile device participating in the session, and
wherein the security service includes a reporting agent that generates report messages similar to the report message specifying the threat to the mobile network.

7. The network system of claim 1, wherein the one or more actions comprise one or more of reset a connection identified as being involved in the threat and dropping a packet identified as being involved in the threat.

8. The network system of claim 1, further comprising a server that stores service subscription data,
wherein the at least one interface of the NMS receives a request from the at least one network security device for services to which one of the plurality of mobile devices subscribes, wherein the request specifies an address assigned to the one of the plurality of mobile devices,
wherein the control unit of the NMS accesses the server that stores the service subscription data using the address assigned to the one of the plurality of mobile devices to determine services to which the one of the plurality of mobile devices subscribes, and
wherein the at least one interface of the NMS transmits the determined services to which the one of the plurality of mobile devices subscribes to the at least one network security device so that the at least one network security device is able to determine whether to redirect a session to which the one of the plurality of mobile devices is participating to a captive portal that offers a security service, wherein the security service includes a reporting agent that generates report messages similar to the report message specifying the threat to the mobile network.

9. A method comprising:

receiving, with a mobile device manager (MDM) of a management system that manages a plurality of mobile devices that access a mobile network, a report message from one of the plurality of mobile devices, wherein the report message specifies a threat to the mobile network originating from a public network to which the mobile network connects; and publishing, with the MDM, the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report message.

10. The method of claim 9, wherein the report message specifies the threat to the mobile network in terms of a ranking that indicates a severity of the threat to the mobile network, and wherein the method further comprises publishing the ranking in addition to the threat to the shared database.

11. A mobile device manager (MDM) device of a management system that manages a plurality of mobile devices that access a mobile network, the MDM device comprising:

at least one interface that receives a report message from one of the plurality of mobile devices, wherein the report message specifies a threat to the mobile network originating from a public network to which the mobile network connects; and at least one control unit that publishes the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report, the at least one network security device positioned upstream from the mobile devices at the edge of the mobile network and between the mobile network and the public network.

12. The MDM device of claim 11, wherein the report message specifies the threat to the mobile network in terms of a ranking that indicates a severity of the threat to the mobile network, and wherein the control unit publishes the ranking in addition to the threat to the shared database.

13. A non-transitory computer-readable medium comprising instructions that, when executed, cause one or more processors of a mobile device manager (MDM) device included within a management system to:

receive a report message from one of a plurality of mobile devices managed by the MDM device, wherein the report message specifies a threat to a mobile network originating from a public network to which the mobile network connects; and publish the threat to a shared database in accordance with an interface for metadata access points (IF-MAP) standard such that a network management system (NMS) of the management system that manages at least one network security device of the mobile network is able to generate a security policy that specifies one or more actions to address the threat specified in the report message and install the security policy in the at least one network security device so that the network security device performs the actions of the security policy to address the threat specified in the report message, the at least one network security device positioned upstream from the mobile devices at the edge of the mobile network and between the mobile network and the public network.

14. A method comprising:

receiving, with a network management system (NMS) of a management system that manages at least one network security device positioned upstream from a plurality of mobile devices that access a mobile network and between the mobile network and a public network, data from a shared database in accordance with an interface for metadata access points (IF-MAP) standard, wherein the data identifies a threat to the mobile network originating from the public network to which the mobile network connects, and wherein the shared database is shared by a mobile device manager (MDM) of the management system and the NMS;

generating, with the NMS, a security policy that specifies one or more actions to address the threat specified by the received data; and installing, with the NMS, the security policy in the at least one network security device so that the network security device performs the actions of the security policy to address the threat specified in the received message.

15. The method of claim 14, wherein the received data specifies the threat to the mobile network in terms of a ranking that indicates a severity of the threat to the mobile network, and wherein the method further comprises determining the one or more actions specified in the security policy based on the ranking.

16. The method of claim 14, wherein the one or more actions comprise redirecting a session identified as involved in the threat to a captive portal hosted by the mobile network to offer one or more services to one of the plurality of mobile devices participating in the session.

17. The method of claim 16, wherein redirecting the session identified as involved in the threat to the captive portal comprises redirecting the session identified as involved in the threat to the captive portal to offer a security service to the one of the plurality of mobile device participating in the session, and wherein the security service includes a reporting agent that generates report messages similar to the report message specifying the threat to the mobile network.

18. The method of claim 14, wherein the one or more actions comprise dropping a packet identified as being involved in the threat.

19. The method of claim 14, further comprising:

receiving a request from the at least one network security device for services to which one of the plurality of mobile devices subscribes, wherein the request specifies an address assigned to the one of the plurality of mobile devices;

accessing a server that stores service subscription data using the address assigned to the one of the plurality of mobile devices to determine the services to which the one of the plurality of mobile devices subscribes; and transmitting the determined services to which the one of the plurality of mobile devices subscribes to the at least one network security device so that the at least one network security device is able to determine whether to redirect a session to which the one of the plurality of mobile devices is participating to a captive portal that offers a security service, wherein the security service includes a reporting agent that generates report messages similar to the report message specifying the threat to the mobile network.

20. A network management system (NMS) of a management system that manages at least one network security device positioned between a mobile network and a public network, the NMS comprising:

at least one interface that receives data from a shared database in accordance with an interface for metadata access points (IF-MAP) standard, wherein the data identifies a threat to the mobile network originating from the public network to which the mobile network connects, and wherein the shared database is shared by a mobile device manager (MDM) of the management system and the NMS; and a control unit that generates a security policy that specifies one or more actions to address the threat specified by the received data and installs the security policy in the at least one network security device so that the network security device performs the actions of the security policy to address the threat specified in the received message, the at least one network security device positioned upstream from the mobile devices at the edge of the mobile network and between the mobile network and the public network.

21. The NMS of claim 20, wherein the received data specifies the threat to the mobile network in terms of a ranking that indicates a severity of the threat to the mobile network, and wherein the method further comprises determining the one or more actions specified in the security policy based on the ranking.

22. The NMS of claim 20, wherein the one or more actions comprise redirecting a session identified as involved in the threat to a captive portal hosted by the mobile network to offer one or more services to one of the plurality of mobile devices participating in the session.

23. The NMS of claim 22, wherein redirecting the session identified as involved in the threat to the captive portal comprises redirecting the session identified as involved in the threat to the captive portal to offer a security service to the one of the plurality of mobile device participating in the session, and wherein the security service includes a reporting agent that generates report messages similar to the report message specifying the threat to the mobile network.

24. The NMS of claim 20, wherein the one or more actions comprise dropping a packet identified as being involved in the threat.

25. The NMS of claim 20, wherein the at least one interface further receives a request from the at least one network security device for services to which one of the plurality of mobile devices subscribes, wherein the request specifies an address assigned to the one of the plurality of mobile devices, wherein the control unit further accesses a server that stores service subscription data using the address assigned to the one of the plurality of mobile devices to determine the services to which the one of the plurality of mobile devices subscribes, wherein the at least one interface further transmits the determined services to which the one of the plurality of mobile devices subscribes to the at least one network security device so that the at least one network security device is able to determine whether to redirect a session to which the one of the plurality of mobile devices is participating to a captive portal that offers a security service, and wherein the security service includes a reporting agent that generates report messages similar to the report message specifying the threat to the mobile network.

26. A non-transitory computer-readable medium comprising instructions that, when executed, cause one or more processors of a network management system (NMS) to:

receive data from a shared database in accordance with an interface for metadata access points (IF-MAP) standard, wherein the data identifies a threat to a mobile network originating from a public network to which the mobile network connects, and wherein the shared database is shared by a mobile device manager (MDM) and the NMS;

generate a security policy that specifies one or more actions to address the threat specified by the received data; and install the security policy in at least one network security device positioned upstream from a plurality of mobile devices that access the mobile network and between the mobile network and the public network so that the network security device performs the actions of the security policy to address the threat specified in the received message.

* * * * *